(No Model)

H. C. LOWE & F. C. GANDEE.
PRUNING IMPLEMENT.

No. 573,339. Patented Dec. 15, 1896.

WITNESSES:

INVENTORS:

UNITED STATES PATENT OFFICE.

HENRY C. LOWE AND FLOYD C. GANDEE, OF GANDEEVILLE, WEST VIRGINIA.

PRUNING IMPLEMENT.

SPECIFICATION forming part of Letters Patent No. 573,339, dated December 15, 1896.

Application filed September 5, 1896. Serial No. 605,011. (No model.)

*To all whom it may concern:*

Be it known that we, HENRY C. LOWE and FLOYD C. GANDEE, citizens of the United States, residing at Gandeeville, in the county of Roane and State of West Virginia, have invented certain new and useful Improvements in Pruning Implements; and we do hereby declare the following to be a full, clear, and exact description of the invention, such as will enable others skilled in the art to which it appertains to make and use the same.

Our invention relates to pruning implements; and it consists of certain novel constructions, combinations, and arrangements of parts, as will be hereinafter fully described and claimed.

Figure 1:
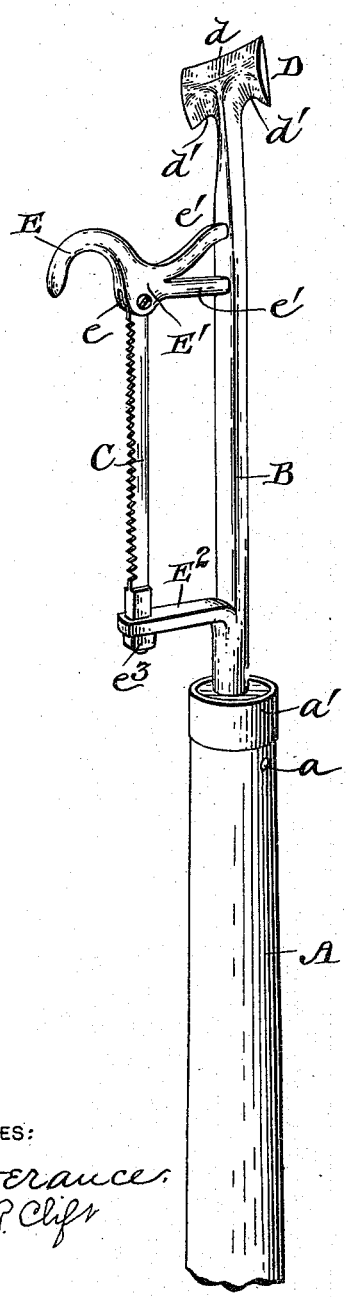
Figure 2:
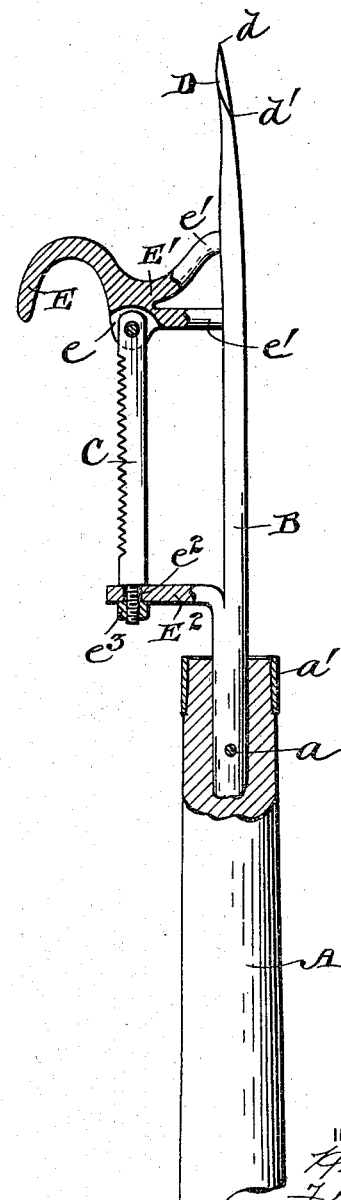

In the accompanying drawings, Figure 1 represents a perspective view of our improved device; and Fig. 2 represents a side elevation of the same, parts being shown in section to more fully disclose the construction.

A in the drawings represents a handle; B, a shank secured therein; C, a saw; D, a cutting-head, and E a hook.

The handle A is preferably made of wood, and may be of any desired length suitable for the purposes of pruning. The shank B is secured in one end of the handle A in such a manner that it will not be readily loosened or pulled out by the use of the implement, as, for instance, by passing a pin through the said handle and shank, as at $a$. The upper end of the handle may be protected by a ring of metal $a'$.

Upon the upper end of the shank is formed a chisel cutting-head D, provided with an upper cutting edge $d$ and two lower cutting edges $d'$ $d'$. The upper cutting edge $d$ preferably extends the whole width of the head D and curves slightly downward in the center. The cutting edges $d'$ $d'$ are arranged on either side of the shank B on the under side of the head D and are curved upward. These cutting edges are preferably beveled on the forward side of the pruning implement.

The upper end of the shank B and the cutting-head D are slightly bent or curved forward, as shown in Fig. 2, by which arrangement it will be seen the cutting edges $d$ and $d'$ $d'$ extend in a plane at a slight angle to the plane of the handle A. By this construction it is not necessary for the operator to stand just under the point of the cut being made, but he can stand a little forward of the same and still make a proper and effective cut. This is an important feature of this device, as in pruning trees and shrubs it is often not possible to get into the direct line of the cut, and there are many times when it is not desirable.

Below the head D a bracket E' is secured to the shank B by prongs $e'$ $e'$, which prongs are so arranged as to brace the bracket E' firmly. The bracket E' is extended forward into a hook E. In the under side of the bracket is a slot or recess $e$, adapted to receive the upper end of the saw C, which is secured therein by a screw, so that it may be easily removed. The saw C is supported at its lower end by a bracket $E^2$, which extends out from the shank B. The saw C is removably secured to the bracket $E^2$ by having its lower end screw-threaded and passed through an aperture $e^2$, in which it is held by the nut $e^3$.

It will be observed that with this implement a limb or branch may be cut either by an upward or a downward stroke. In most instances it is desirable to combine both movements, as, for instance, first, cut with the under edge the bark upon the upper side of a limb thoroughly with a downstroke of the implement, and then with an upstroke make a clean cut through the limb from the under side thereof. In this way all liability of tearing the bark and thereby injuring the tree is avoided. It will also be seen that by having the saw C and the hook E in the above-described relation to each other the operator is enabled after sawing a limb to readily pull the same down out of the tree. The hook also enables the operator to climb a tree easily, or by it the implement can be first hung in the part of the tree to be operated upon until the pruner or operator can climb to that place. By our construction the saw can also be quickly and easily removed at any time for sharpening or for replacing it by a new one.

What we claim is—

1. A pruning implement, consisting of a chisel cutting-head, a suitable shank for carrying the same, brackets projecting from the same, below the cutting-head, a hook formed upon the upper bracket, a saw secured between the brackets below the hook, and a handle, substantially as described.

2. A pruning implement, consisting of a chisel-head provided with an upper cutting edge and two lower edges, a shank for carrying the same, the said chisel-head and upper part of the shank being set slightly forward, brackets projecting from the said shank, below the chisel-head, and at right angles to the same, a hook formed upon the upper bracket, a saw removably secured to the said brackets, below the hook, and a handle, substantially as described.

In testimony whereof we affix our signatures in presence of two witnesses.

HENRY C. LOWE.
FLOYD C. GANDEE.

Witnesses:
JNO. P. BATTEN,
JOHN L. ARNOLD.